(12) United States Patent
Gauthier et al.

(10) Patent No.: US 10,150,383 B2
(45) Date of Patent: Dec. 11, 2018

(54) EV ADAPTIVE THERMAL MANAGEMENT SYSTEM OPTIMIZED TO MINIMIZE POWER CONSUMPTION

(71) Applicant: Atieva, Inc., Menlo Park, CA (US)

(72) Inventors: Jean-Philippe Gauthier, San Francisco, CA (US); Benson Tsai, Mountain View, CA (US)

(73) Assignee: ATIEVA, INC., Newark, CA (US)

( * ) Notice: Subject to any disclaimer, the term of this patent is extended or adjusted under 35 U.S.C. 154(b) by 284 days.

(21) Appl. No.: 15/350,610

(22) Filed: Nov. 14, 2016

(65) Prior Publication Data

US 2017/0057375 A1   Mar. 2, 2017

Related U.S. Application Data

(63) Continuation of application No. 14/493,509, filed on Sep. 23, 2014, now Pat. No. 9,527,404.

(51) Int. Cl.
*B60L 11/18*   (2006.01)
*B60H 1/00*   (2006.01)
(Continued)

(52) U.S. Cl.
CPC ...... *B60L 11/1874* (2013.01); *B60H 1/00278* (2013.01); *B60L 1/003* (2013.01); *B60L 1/02* (2013.01); *B60L 3/0046* (2013.01); *B60L 3/0061* (2013.01); *B60L 11/1875* (2013.01); *B60K 6/28* (2013.01); *B60K 2001/005* (2013.01); *B60L 2240/34* (2013.01); *B60L 2240/36* (2013.01); *B60L 2240/445* (2013.01); *B60L 2240/545* (2013.01);
(Continued)

(58) Field of Classification Search
CPC .... B60L 11/1874; B60L 1/003; B60L 3/0046; B60L 3/0061; B60L 11/1875; B60L 2240/34; B60L 2240/445; B60L 2240/545; B60L 2240/36; B60L 2240/662; B60H 1/00278; Y02T 10/705; Y02T 10/7005; Y10S 903/907; B60K 6/28; B60K 2001/005; B60Y 2200/91; B60Y 2200/92; B60Y 2400/112
USPC ........................................................ 165/289
See application file for complete search history.

(56) References Cited

U.S. PATENT DOCUMENTS 5,305,613 A * 4/1994 Hotta ................. B60H 1/00392
180/65.1
5,555,737 A * 9/1996 Takeo ................. B60H 1/00392
62/230

(Continued)

*Primary Examiner* — Claire Rojohn, III
(74) *Attorney, Agent, or Firm* — Patent Law Office of David G. Beck (57) ABSTRACT

A method of operating the thermal management system in a vehicle is provided, where the thermal management system includes a heat exchanger (e.g., a radiator) and a heat source (e.g., battery pack, drive train, power electronics, etc.). After characterizing the thermal management system, whenever the system controller issues a cooling demand an appropriate set of operating settings is determined that minimizes the amount of power consumed by the system's actuators (e.g., blower fan, coolant pump) while still meeting the cooling demand. As a result, the heat source is cooled to the degree required with a minimum expenditure of power, thereby minimizing the impact on driving range and vehicle performance.

15 Claims, 9 Drawing Sheets

(51) Int. Cl.
  *B60L 1/00*       (2006.01)
  *B60L 1/02*       (2006.01)
  *B60L 3/00*       (2006.01)
  *B60K 6/28*         (2007.10)
  *B60K 1/00*         (2006.01)

(52) U.S. Cl.
  CPC ..... *B60L 2240/662* (2013.01); *B60Y 2200/91* (2013.01); *B60Y 2200/92* (2013.01); *B60Y 2400/112* (2013.01); *Y02T 10/705* (2013.01); *Y02T 10/7005* (2013.01); *Y10S 903/907* (2013.01)

(56) References Cited

U.S. PATENT DOCUMENTS

| | | | | |
|---|---|---|---|---|
| 5,562,538 A * | 10/1996 | Suyama | ............ | B60H 1/00392 165/267 |
| 6,047,770 A * | 4/2000 | Suzuki | ............ | B60H 1/00007 165/202 |
| 6,360,835 B1 * | 3/2002 | Skala | ............ | B60L 11/1892 123/41.29 |
| 6,651,761 B1 | 11/2003 | Hrovat | | |
| 6,699,610 B2 | 3/2004 | Yang | | |
| 7,191,858 B2 | 3/2007 | Vanderwees | | |
| 7,410,016 B2 | 8/2008 | Schumann | | |
| 7,789,176 B2 | 9/2010 | Zhou | | |
| 8,047,319 B2 | 11/2011 | Maier | | |
| 8,336,319 B2 | 12/2012 | Johnston | | |
| 2008/0211230 A1 * | 9/2008 | Gurin | ............ | B60K 6/28 290/2 |
| 2009/0130513 A1 * | 5/2009 | Tsuchiya | ............ | B60H 1/00385 429/412 |
| 2011/0136424 A1 * | 6/2011 | Park | ............ | B60H 1/00278 454/75 |
| 2012/0003510 A1 * | 1/2012 | Eisenhour | ............ | H01M 10/625 429/50 |
| 2012/0305662 A1 * | 12/2012 | Miyano | ............ | H02J 7/00 236/44 C |
| 2013/0291577 A1 * | 11/2013 | Miyakoshi | ............ | B60H 1/00392 62/151 |
| 2014/0183957 A1 | 7/2014 | Duchesneau | | |
| 2017/0036514 A1 * | 2/2017 | Umehara | ............ | B60H 1/00278 |

* cited by examiner

EV ADAPTIVE THERMAL MANAGEMENT SYSTEM OPTIMIZED TO MINIMIZE POWER CONSUMPTION

CROSS-REFERENCE TO RELATED APPLICATION

This application is a continuation of U.S. patent application Ser. No. 14/493,509, filed 23 Sep. 2014, the disclosure of which is incorporated herein by reference for any and all purposes.

FIELD OF THE INVENTION

The present invention relates generally to the thermal management system of an electric vehicle and, more particularly, to a system and method of use designed to adapt the thermal management system to current conditions in order to minimize power consumption.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

Electric vehicles, due to their reliance on rechargeable batteries, require a relatively sophisticated thermal management system to insure that the batteries remain within their desired operating temperature range while still providing adequate heating and cooling within the passenger cabin and not unduly affecting the vehicle's overall operating efficiency. A variety of approaches have been taken to try and meet these goals. For example, U.S. Pat. No. 6,360,835 discloses a thermal management system for use with a fuel-cell-powered vehicle, the system utilizing both low and high temperature heat transfer circuits that share a common heat transfer medium, the dual circuits required to adequately cool the vehicle's exothermic components and heat the vehicle's endothermic components.

U.S. Pat. No. 7,789,176 discloses a thermal management system that utilizes multiple cooling loops and a single heat exchanger. In an exemplary embodiment, one cooling loop is used to cool the energy storage system, a second cooling loop corresponds to the HVAC subsystem, and a third cooling loop corresponds to the drive motor cooling system. The use of a heater coupled to the first cooling loop is also disclosed, the heater providing a means for insuring that the batteries are warm enough during initial vehicle operation or when exposed to very low ambient temperatures.

U.S. Pat. No. 8,336,319 discloses an EV dual mode thermal management system designed to optimize efficiency between two coolant loops, the first cooling loop in thermal communication with the vehicle's batteries and the second cooling loop in thermal communication with at least one drive train component such as an electric motor or an inverter. The disclosed system uses a dual mode valve system to configure the thermal management system between a first mode and a second mode of operation, where in the first mode the two cooling loops operate in parallel and in the second mode the two cooling loops operate in series.

Although the prior art discloses numerous techniques for cooling the battery pack of an electric vehicle, an improved thermal management system is needed that is capable of maintaining the batteries within their desired operating temperature range while still providing means for optimizing overall vehicle operating efficiency. The present invention provides such a thermal management system.

SUMMARY OF THE INVENTION

The present invention provides a method of operating the thermal management system in a vehicle, where the thermal management system includes a heat exchanger (e.g., a radiator) and a heat source (e.g., battery pack, drive train, power electronics, etc.). The method includes the steps of (i) characterizing the thermal management system, where the step of characterizing the vehicle thermal management system further comprises the step of determining a power dissipation data set for the thermal management system; (ii) determining a power dissipation factor data set based on the power dissipation data set; (iii) determining a power consumption data set corresponding to the thermal management system, where the power consumption data set represents a plurality of power consumption datum, and where each of the plurality of power consumption datum corresponds to at least one combination of a plurality of operating settings for the vehicle thermal management system; (iv) characterizing the heat source, where the heat source is thermally coupled to the thermal management system, where the step of characterizing the heat source further comprises the step of determining a heat source data set, and where the heat source data set is comprised of a plurality of heat generation datum versus a plurality of heat source usage datum; (v) periodically determining a cooling demand based on the heat source usage datum; (vi) determining a power demand based on the cooling demand; (vii) deriving a subset of the plurality of operating settings from the power demand and the power dissipation factor data set and the power consumption data set, where the subset of the plurality of operating settings (e.g., a combination of one of a plurality of blower fan speed settings and one of a plurality of coolant pump flow settings) minimizes power consumption in the thermal management system while meeting the power demand; and (viii) applying the subset of the plurality of operating settings to the thermal management system. The power dissipation data set is comprised of a first plurality of power dissipation datum, a second plurality of power dissipation datum, and a third plurality of power dissipation datum. The step of determining the power dissipation data set further includes (i) determining the first plurality of power dissipation datum relative to a plurality of air speeds through the heat exchanger; (ii) determining the second plurality of power dissipation datum relative to a plurality of coolant flow rates through the heat exchanger; and (iii) determining the third plurality of power dissipation datum relative to a plurality of input temperature differentials for the heat exchanger.

The method may further include the step of storing in a memory the power dissipation factor data set, the power consumption data set and the heat source data set, where the memory is accessible by a thermal management system controller, and where the thermal management system controller performs the steps of periodically determining the cooling demand, determining the power demand, and deriving and applying the subset of the plurality of operating settings. The step of determining the power demand may include the step of adding an offset to the cooling demand.

Preferably, the step of determining the first plurality of power dissipation datum relative to a plurality of air speeds through the heat exchanger is performed while holding constant the coolant flow rate and the input temperature differential; similarly, the step of determining the second plurality of power dissipation datum relative to a plurality of coolant flow rates through the heat exchanger is performed while holding constant the air speed and the input temperature differential; similarly, the step of determining the third plurality of power dissipation datum relative to a plurality of input temperature differentials for the heat exchanger is performed while holding constant the air speed and the coolant flow rate and the ambient temperature. The power dissipation factor data set may be comprised of the first plurality of power dissipation datum versus the second plurality of power dissipation datum versus the third plurality of power dissipation datum. The step of determining the power dissipation factor data set may further comprise the step of dividing each of the first, second and third pluralities of power dissipation datum by a preset power constant ($P_a$), where the preset power constant may be approximately centered within the operating domain of the thermal management system, and/or may be approximately centered within the operating domain of the thermal management system's coolant pump, and/or may be approximately centered within the operating domain of the thermal management system's blower fan.

In another aspect of the method where the thermal management system includes a blower fan and a coolant pump, each of the plurality of power consumption datum corresponds to the power consumed for a combination of one of a plurality of blower fan speed settings and one of a plurality of coolant pump flow settings.

In another aspect of the method where the heat source is comprised of a battery pack containing a plurality of batteries, the step of characterizing the heat source may further comprise the step of determining the efficiency versus the operating temperature for the batteries. When the heat source is comprised of a battery pack containing a plurality of batteries, each of the plurality of heat source usage datum may correspond to a power level demand placed on the batteries.

In another aspect, the method may further include the steps of (i) monitoring ambient temperature, (ii) monitoring the current coolant input temperature corresponding to the heat exchanger input, and (iii) determining a current input temperature differential between the ambient temperature and the current coolant input temperature, where the subset of the plurality of operating settings is derived from the power demand and the power dissipation factor data set and the power consumption data set and the current input temperature differential.

In another aspect of the method where the thermal management system includes a blower fan and a coolant pump, the method may further include the steps of (i) monitoring the blower fan current, (ii) monitoring the coolant pump current, and (iii) modifying the power consumption data set based on the blower fan current and the coolant pump current.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the term "battery" may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to one or more batteries, often contained within an enclosure, electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Throughout the process of designing and building a car, the engineering team must continually balance the various performance and design goals set for the car with the requirements placed on the car to insure that the car can be manufactured at the desired cost. Due to these often conflicting requirements, the control system used in a conventional car's thermal management system is often quite simple, typically utilizing trigger temperatures to activate and deactivate the system's blower fans and coolant pumps. While the thermal requirements of an EV are more complicated than those of a conventional car due to the inclusion of a battery pack, EV manufacturers continue to use relatively simple control systems utilizing on/off commands and trigger temperatures. Although such a system may meet the vehicle's thermal requirements, this form of system control is often quite inefficient from a power usage point of view. Recognizing that every system that draws power will have an adverse effect on an EV's driving range, and potentially its performance, the thermal control system of the present invention is designed to minimize power consumption while still achieving the system's thermal goals.

Figure 1:
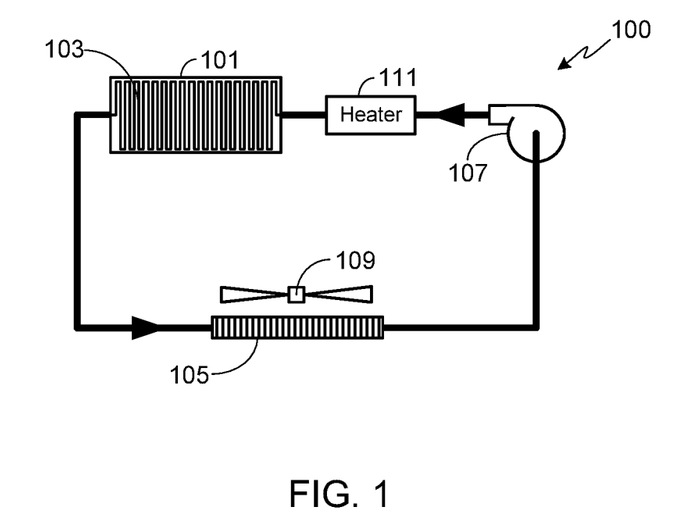
FIG. 1 illustrates an exemplary battery pack cooling system that may be used with the current invention.
Figure 2:
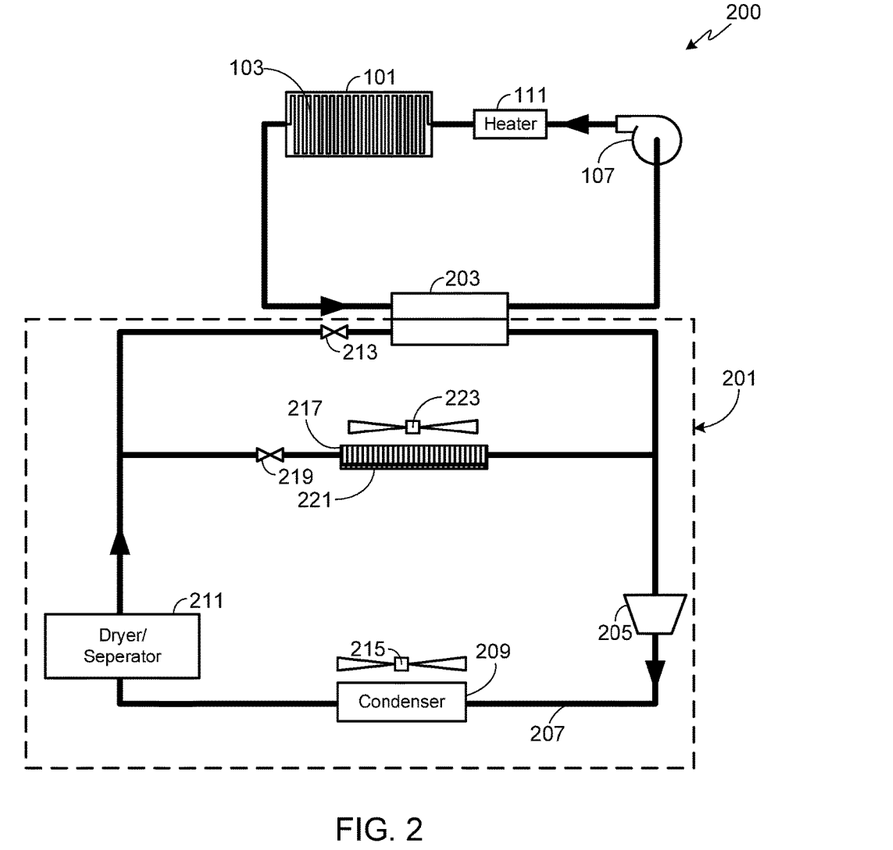
FIG. 2 illustrates an alternate battery pack cooling system that may be used with the current invention.
Figure 3:
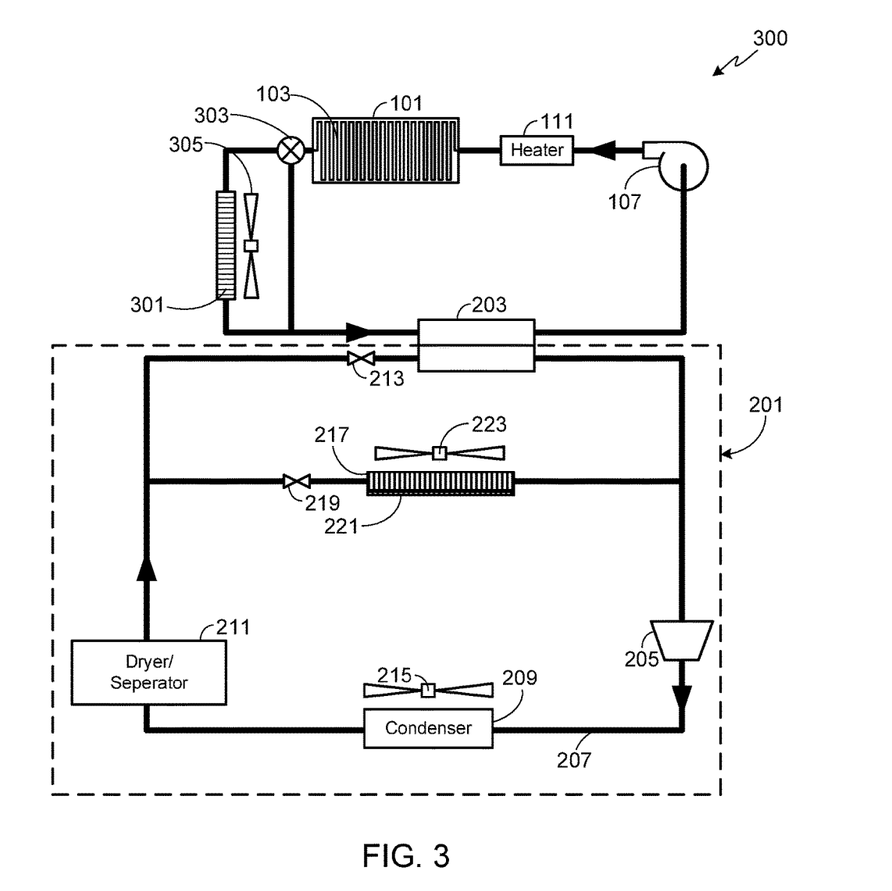
FIG. 3 illustrates an alternate battery pack cooling system that may be used with the current invention, the illustrated system utilizing both a radiator and a heat exchanger as described relative to FIGS. 1 and 2, respectively.

The present invention is not limited to a thermal management system configured in a particular manner; rather the present invention provides a method of minimizing power consumption of virtually any thermal management system. FIGS. 1-3 illustrate three different configurations for a vehicle's thermal management system that can be used with the present invention. It should be understood, however, that other configurations may be used with the invention and that the invention is not limited to a particular type of vehicle, i.e., it may be used with an internal combustion engine (ICE) based vehicle, an all-electric vehicle, or a hybrid vehicle. Furthermore, while these exemplary systems are used to control the temperature of a battery pack, the methodology of the present invention can be similarly applied to a thermal management system used to control other components and subsystems, for example drive train components (e.g., engine, motor, transmission, etc.) and/or power electronics (e.g., power inverter, etc.).

FIG. 1 illustrates an exemplary battery thermal management system 100. In system 100, the temperature of the batteries within battery pack 101 is controlled by pumping a thermal transfer medium, e.g., a liquid coolant, through a plurality of cooling conduits 103 integrated into battery pack 101. Conduits 103, which are fabricated from a material with a relatively high thermal conductivity, are positioned within pack 101 in order to optimize thermal communication between the individual batteries, not shown, and the conduits, thereby allowing the temperature of the batteries to be regulated by regulating the flow of coolant within conduits 103 and/or regulating the transfer of heat from the coolant to another temperature control system. In the illustrated embodiment, the coolant within conduits 103 is pumped through a radiator 105 using a pump 107. A blower fan 109 may be used to force air through radiator 105, for example when the car is stationary or moving at low speeds, thus insuring that there is an adequate transfer of thermal energy from the coolant to the ambient environment. System 100 may also include a heater 111, e.g., a PTC heater, that may be used to heat the coolant within conduits 103, and thus heat the batteries within pack 101.

FIG. 2 illustrates an alternate battery pack thermal management system 200. In system 200 the coolant within conduits 103 is coupled to a secondary thermal management system 201 via a heat exchanger 203. Preferably thermal management system 201 is a refrigeration system and as such, includes a compressor 205 to compress the low temperature vapor in refrigerant line 207 into a high temperature vapor and a condenser 209 in which a portion of the captured heat is dissipated. After passing through condenser 209, the refrigerant changes phases from vapor to liquid, the liquid remaining at a temperature below the saturation temperature at the prevailing pressure. The refrigerant then passes through a dryer 211 that removes moisture from the condensed refrigerant. After dryer 211, refrigerant line 207 is coupled to heat exchanger 203 via thermal expansion valve 213 which controls the flow rate of refrigerant into heat exchanger 203. Additionally, in the illustrated system a blower fan 215 is used in conjunction with condenser 209 to improve system efficiency.

In a typical vehicle configuration, thermal management system 201 is also coupled to the vehicle's heating, ventilation and air conditioning (HVAC) system. In such a system, in addition to coupling refrigerant line 207 to heat exchanger 203, line 207 may also be coupled to the HVAC evaporator 217. A thermal expansion valve 219 is preferably used to control refrigerant flow rate into the evaporator. A heater, for example a PTC heater 221 integrated into evaporator 217, may be used to provide warm air to the passenger cabin. In a conventional HVAC system, one or more fans 223 are used to circulate air throughout the passenger cabin, where the circulating air may be ambient air, air cooled via evaporator 217, or air heated by heater 221.

In some electric vehicles, battery pack cooling is accomplished using a combination of a radiator such as that shown in FIG. 1, and a heat exchanger such as that shown in FIG. 2. FIG. 3 illustrates such a cooling system. In system 300, the coolant passing through battery pack 101 via conduits 103 may be directed through either radiator 301 or heat exchanger 203. Valve 303 controls the flow of coolant through radiator 301. Preferably a blower fan 305 is included in system 300 as shown, thus providing means for forcing air through the radiator when necessary, for example when the car is stationary.

Figure 4:
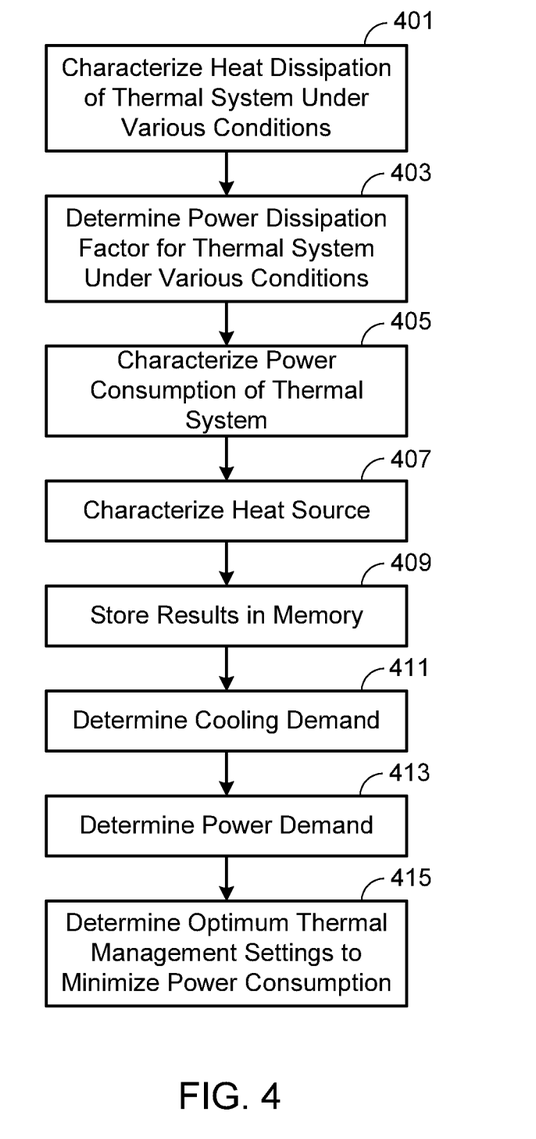
FIG. 4 illustrates the basic methodology of the invention.

In accordance with the invention, and as illustrated in FIG. 4, the first step is to independently characterize the heat dissipation qualities of each aspect of the thermal management system (step 401). These heat dissipation qualities are then used to determine the power dissipation factor for the thermal system under various conditions (step 403). Next, the power consumed by the thermal management system using different settings (i.e., different fan speeds, different pump rates, etc.) is determined (step 405). Additionally, the heat source (e.g., battery pack, drive train components, power electronics, etc.) is characterized (step 407). The results of steps 401, 403, 405 and 407 are stored within a memory accessible by the thermal management system's controller (step 409). During vehicle use, the controller determines a cooling demand based on current conditions for the heat source, e.g., based on the current power output of the battery pack (step 411). A power demand is then calculated (step 413) based on the cooling demand plus a cooling demand offset, where the offset takes into account current heat source (e.g., battery pack) temperature, ambient temperature, desired operating temperature, and the thermal mass of the heat source. Based on the power demand, the system controller determines the optimum settings for the thermal management system that allow sufficient power to be dissipated in order to cool the heat source to the desired operating temperature while consuming a minimum amount of power (step 415). As a consequence, the heat source (e.g., battery pack) is cooled while using the minimum amount of power required, thereby minimizing the impact on driving range and vehicle performance.

As described above, the present invention provides a method that allows the necessary cooling function for a thermal management system to be selected while simultaneously minimizing the power consumed by the system's actuators (e.g., blower fan, coolant pump). By minimizing power consumption, the process improves overall vehicle efficiency, leading to an increase in driving range when the system is used with an EV. While any configuration of thermal management system may utilize the present method, the process is described in detail below for a basic thermal management system that is coupled to a battery pack, e.g., the system shown in FIG. 1.

Initially each component of the thermal management system is characterized by experimentally measuring the power dissipation (i.e., heat removed) in the heat exchanger in accordance with the equation $$P = k_w * Q * \Delta T_w, \text{ where}$$

Figure 5:
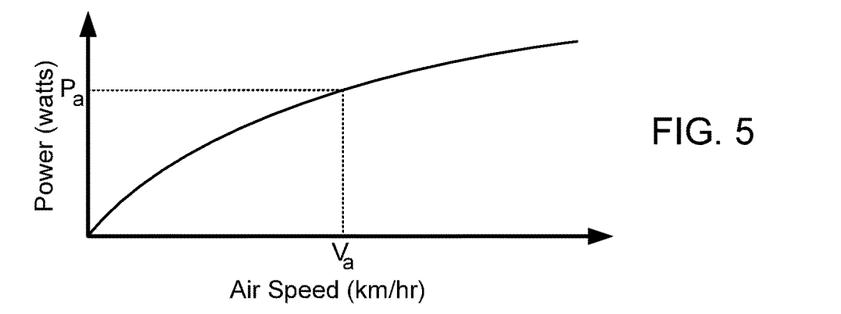
FIG. 5 is the experimentally derived characterization curve for an exemplary embodiment, this curve illustrating the relationship between power dissipation and fan speed.

P is the power dissipation in Watts, $k_w$ is the heat capacity of the coolant (e.g., water) in J/(g*K), Q is the mass flow rate of the coolant (e.g., water) in g/s, and $\Delta T_w$ is the coolant temperature differential between the input and the output of the heat exchanger (e.g., radiator 105). For the exemplary system, three different characterizations must be made. The first characterization experimentally measures the power dissipation while changing the air speed by varying the speed of fan 109. During this measurement, a constant coolant mass flow rate ($Q_a$) is maintained, as is a constant temperature differential between the input coolant temperature and the ambient air temperature ($\Delta T_a$). FIG. 5 illustrates this relationship between power dissipation, P, and air speed, v.

Figure 6:
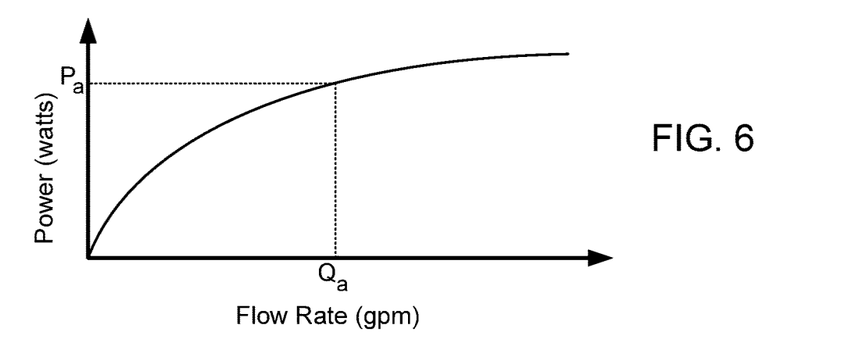
FIG. 6 is the experimentally derived characterization curve for the exemplary embodiment used with FIG. 5, this curve illustrating the relationship between power dissipation and coolant flow rate.

The second characterization experimentally measures the power dissipation while changing the mass flow rate of the coolant by varying coolant pump 107. During this measurement, a constant fan speed ($v_a$) is maintained, as is a constant temperature differential between the input coolant temperature and the ambient air temperature ($\Delta T_a$). FIG. 6 illustrates this relationship between power dissipation, P, and coolant flow rate, Q.

Figure 7:
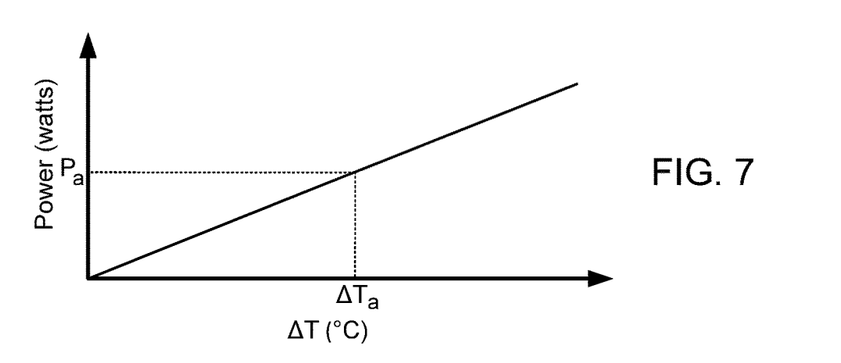
FIG. 7 is the experimentally derived characterization curve for the exemplary embodiment used with FIGS. 5 and 6, this curve illustrating the relationship between power dissipation and the temperature differential ($\Delta T$)

The third characterization experimentally measures the power dissipation while varying the input coolant temperature relative to the ambient temperature, i.e., $\Delta T$. During this measurement, a constant coolant mass flow rate ($Q_a$) and a constant fan speed ($v_a$) are maintained, as is a constant ambient air temperature. FIG. 7 illustrates this relationship between power dissipation, P, and the input temperature differential, $\Delta T$.

Figure 8:
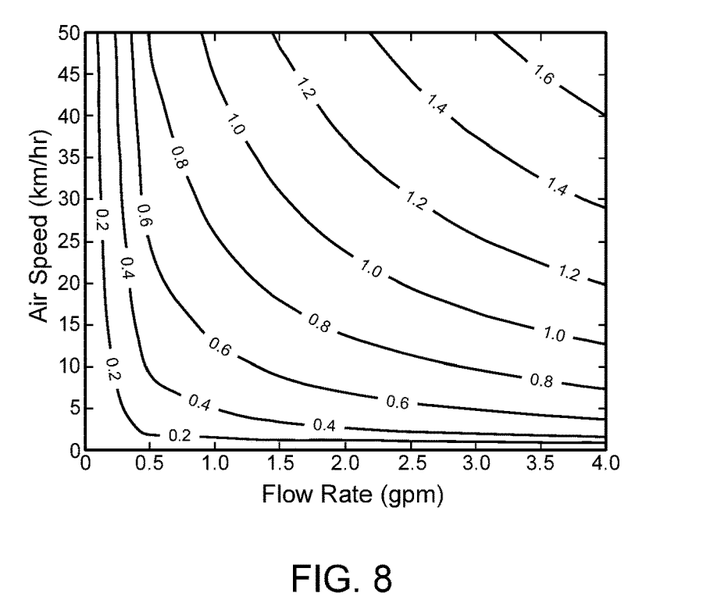
FIG. 8 illustrates a series of curves based on the characterization data shown in FIGS. 5-7, where each curve represents a different power dissipation factor relative to air speed and coolant flow rate and in which the temperature differential is held constant.

Next, the characterization data for the thermal management system (e.g., the data shown in FIGS. 5-7 for the exemplary embodiment) is combined in order to determine the system's power dissipation characteristics. Since there are three characteristics that were experimentally derived above, i.e., power dissipation versus air speed, coolant flow rate, and $\Delta T$, a three-dimensional table is derived. FIG. 8 illustrates one 'slice' of this table, where curves for a series of power dissipation factors (e.g., 0.2, 0.4, 0.6, 0.8, 1.0, 1.2 and 1.4) are shown relative to air speed (y-axis) and coolant flow rate (x-axis). The $\Delta T$ for this slice of the table is set at 20° C. It will be understood that other data slices would be for different values of $\Delta T$.

In FIG. 8 and in the preferred approach, in order to simplify the characterization data, thereby making it easier to utilize, the power dissipation values, P, are divided by $P_a$. Although the value of $P_a$ is somewhat arbitrary, it may be defined as the power dissipation level where the three independent variables v, Q and $\Delta T$ are equal to $v_a$, $Q_a$ and $\Delta T_a$. Preferably $P_a$ is selected to be approximately centered in the thermal management system's operating domain. The $P_a$ used in the present example is shown relative to air speed (v), coolant flow rate (Q), and $\Delta T$ in FIGS. 5-7, respectively.

Figure 9:
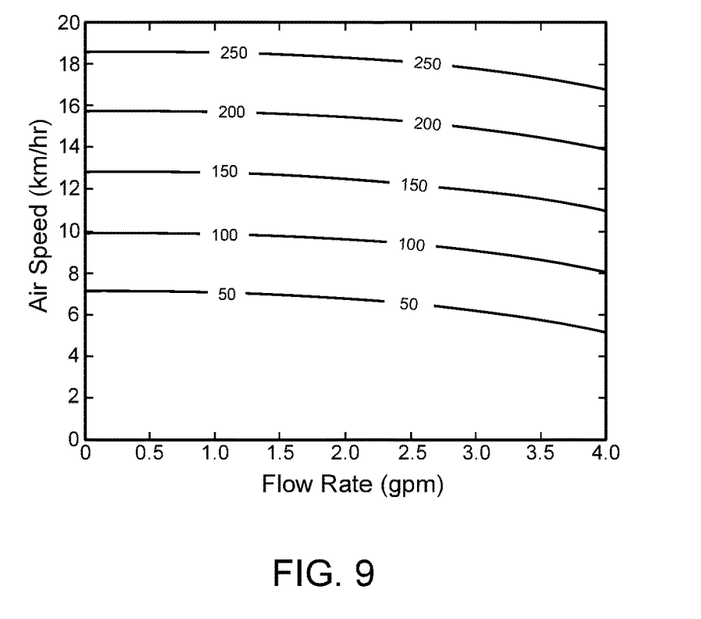
FIG. 9 illustrates a series of power consumption curves of the thermal management system of the exemplary embodiment in which the thermal management system consists of a coolant pump and a blower fan.

As noted above, the power consumption of the thermal management system must also be characterized in order to allow the system to select optimum operational settings. FIG. 9 illustrates a plurality of power consumption curves (e.g., 50 watts, 100 watts, 150 watts, 200 watts, and 250 watts) relative to air speed (y-axis) and coolant flow rate (x-axis) for the exemplary embodiment.

In addition to characterizing the thermal management system, as previously noted the heat source must also be characterized. The heat source in a vehicle may be any subsystem that requires thermal maintenance, i.e., cooling or heating. Exemplary subsystems include the vehicle's battery pack, engine, motor, gearbox, power inverter, etc. In the exemplary configuration used herein to illustrate the methodology of the invention, which is based on the thermal management system of FIG. 1, the heat source is comprised of a battery pack. To characterize the heat source, the efficiency of the battery pack is determined, preferably as a function of temperature. Other vehicle heat sources (e.g., motor, power electronics, etc.) may be similarly characterized.

Once the thermal management system is completely characterized, both in terms of the power factors and the power consumption, and the heat source is characterized, then characterization tables are stored in memory (step 409 described above). After the thermal systems of the vehicle have been characterized, the system is able to determine the appropriate settings to maintain the vehicle's heat source at the optimum operating temperature while minimizing power losses.

In order to select the optimum settings for the thermal management system, a power demand is issued by the vehicle's controller. The power demand is selected to maintain the heat source, e.g., the battery pack, within the desired operating range of temperatures. In general, the power demand is comprised of two parts; the cooling demand and the cooling offset. The cooling demand is based purely on the demands being placed on the heat source. For example, if the heat source is a motor which is being run at high speeds for an extended period of time, then a cooling demand can be derived from the current being drawn by the motor and the efficiency of the motor (which would have been previously characterized). Similarly, in the present example where the heat source is a battery pack, the cooling demand can be derived from the present power being drawn from the battery pack, modified by the efficiency of the battery pack. Generally it can be assumed that the losses due to the inefficiency of the battery pack, or other component, will be expelled as heat.

The cooling offset is used to modify the cooling demand in order to compensate for modeling uncertainties as well as the lag time required to cool (or heat) the battery pack (or other heat source). This lag time is determined by the thermal properties of the heat source, i.e., the thermal mass of the source, as well as the efficiency of the thermal management system used to control the temperature of the heat source.

Once the power demand is determined from the cooling demand and the cooling offset, the system determines the optimum settings for the thermal management system. Several examples are provided below to insure clarity. It should be understood that the invention is not limited to the exemplary system described above, nor is it limited to the examples provided below. For example, the heat source may be comprised of motors, engines, gearboxes, power electronics, battery packs, etc., either alone or in combination. Similarly, the characterization curves provided above, or the values used in the examples, are only meant to illustrate, not limit, the invention.

EXAMPLE 1

This example is based on the above-defined configuration, i.e., a heat source comprised of a battery pack and a thermal management system that includes a radiator, a coolant pump and a blower fan. For purposes of the present example it is assumed that the vehicle is stationary (e.g., parked) and that the temperature differential, $\Delta T$, between the ambient temperature and the temperature of the radiator's coolant input is 20° C. Based on the current load on the battery and the pre-determined cooling offset, the controller in this situation issues a power demand of 4000 watts. Since in the characterization data a $P_a$ of 5600 watts was used, the power demand equates to 4000/5600 or 0.714.

Figure 10:
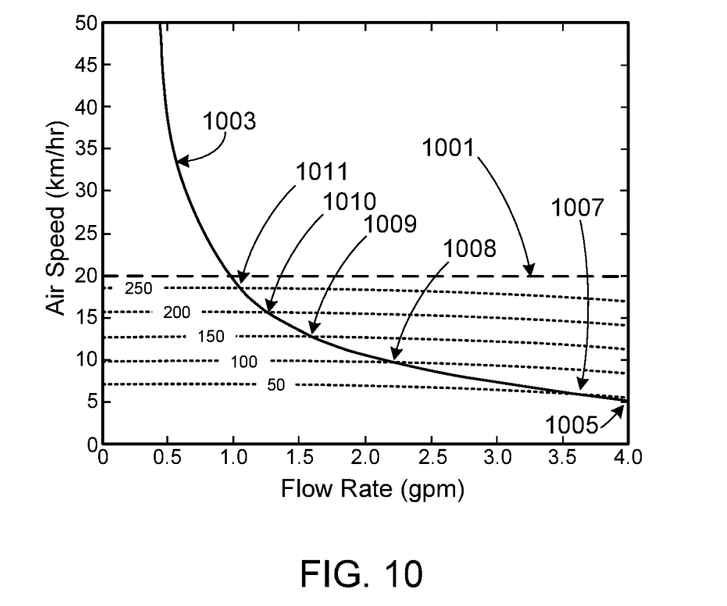
FIG. 10 illustrates the application of the methodology of the invention to the thermal management system shown in FIG. 1 and to a specific cooling demand.

FIG. 10 plots coolant flow rate, Q, against air speed, v. The coolant flow rate is based on the operating range of the coolant pump and therefore is limited in this example to 4.0 gpm. Since air speed represents the speed of the air flowing through radiator 105, it is only limited by the capabilities of blower fan 109 when the car is stationary or moving at low speeds. When the car is traveling at high speed, the motion of the car forces air to pass through the radiator at approximately the same speed as the car is traveling, thereby eliminating the limitations of the blower fan. In this example, blower fan 109 is limited to 20 km/hr (line 1001).

Curve 1003 represents the power demand curve set for 0.714. It should be understood that in many cases the power demand, i.e., the power dissipation factor, required by a specific set of conditions may not be included in the stored data used by the thermal management system's controller to determine appropriate settings. In this situation, the required power dissipation factor is interpolated from the previously determined data. For example, in the present instance curve 1003 for a power demand of 0.714 is derived from the curves for the power dissipation factors of 0.6 and 0.8.

The graph of FIG. 10 also includes a series of power consumption curves, specifically the power consumption curves shown in FIG. 9. It should be understood that these curves are only representative curves for specific power consumption levels, i.e., 50, 100, 150, 200 and 250 watts, and that other levels of power consumption are available up to the limits imposed by the maximum blower fan output (e.g., 20 km/hr) and the maximum pump rate (e.g., 4 gpm).

The optimal settings for the thermal management system are given by the crossover point between the power demand curve 1003 and the lowest level of power consumption available given the limitations of the coolant pump and the blower fan. In the exemplary embodiment, the lowest level of power consumption occurs at point 1005. At location 1005, the cooling demand placed on the thermal management system by the current conditions will be met while a minimum amount of power is consumed, specifically 45 watts. At crossover point 1005 the coolant pump is operating at its maximum capacity, i.e., 4 gpm, while the blower fan is operating at approximately 5 km/hr. Note that the cooling demands placed on the thermal management system may be met by a wide range of pump and fan settings, but the setting (i.e., crossover point 1005) determined by the present method meets this demand while minimizing power consumption. Thus while lower pump speeds and higher fan speeds, such as those identified as crossover points 1007-1011, would cool the battery pack and meet the cooling demand in this example, these settings would require substantially more power, i.e., between 5 watts (crossover point 1007) and 200 watts (crossover point 1011) more, than that required by following the methodology of the present invention.

EXAMPLE 2

This example is based on the same configuration as that used in the first example, but assumes that the vehicle is traveling at a rate of 40 km/hr and that the difference in temperature ($\Delta T$) between the ambient temperature and the input of the radiator is 18° C. Based on the current load on the battery and the pre-determined cooling offset, the controller in this situation issues a power demand of 4500 watts which, using a $P_a$ of 5600 watts, yields a power demand equivalent to 4500/5600 or 0.804.

Figure 11:
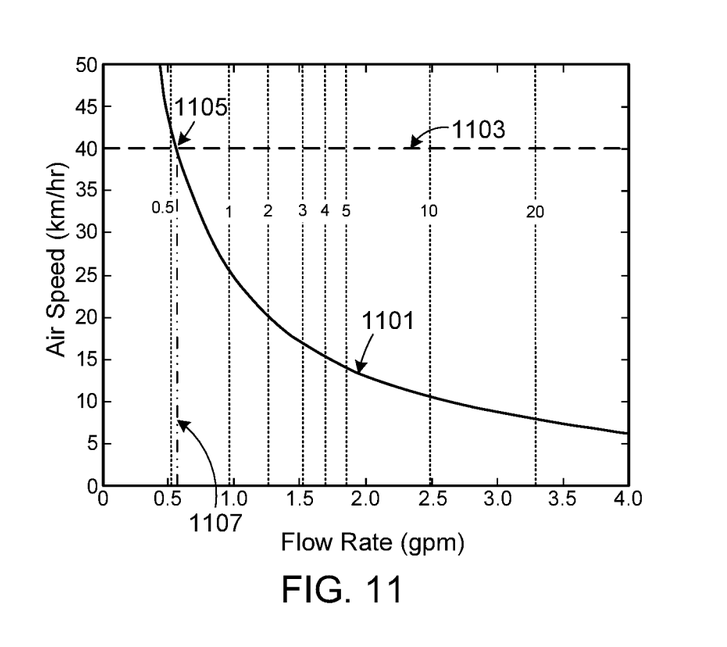
FIG. 11 illustrates the application of the methodology of the invention to the thermal management system shown in FIG. 1 and to an alternate cooling demand.

FIG. 11, as with FIG. 10, plots coolant flow rate, Q, against air speed, v. Curve 1101 represents the power demand curve set for 0.804. Note that since $\Delta T$ in this example is 18° C., curve 1101 is shifted from the 0.8 curve shown in FIG. 8 which was taken with a $\Delta T$ of 20° C. Furthermore, since the car is traveling at a rate of 40 km/hr, air is forced through the radiator at approximately 40 km/hr (shown as line 1103 in FIG. 11), thereby allowing power to be conserved by turning blower fan 109 off.

Since fan 109 is turned off with the vehicle traveling at 40 km/hr in this example, the power consumption curves shown in FIG. 11 are based solely on the use of pump 107 and as such are represented by vertical dashed lines. In this configuration the optimal setting for the coolant pump is given by the crossover point 1105 between the power demand curve 1101 and air speed line 1103. As seen from the figure (see line 1107), crossover point 1105 yields a pump setting that provides a coolant flow rate of approximately 0.6 gpm, and a level of power consumption of between 0.5 and 0.6 watts.

Figure 12:
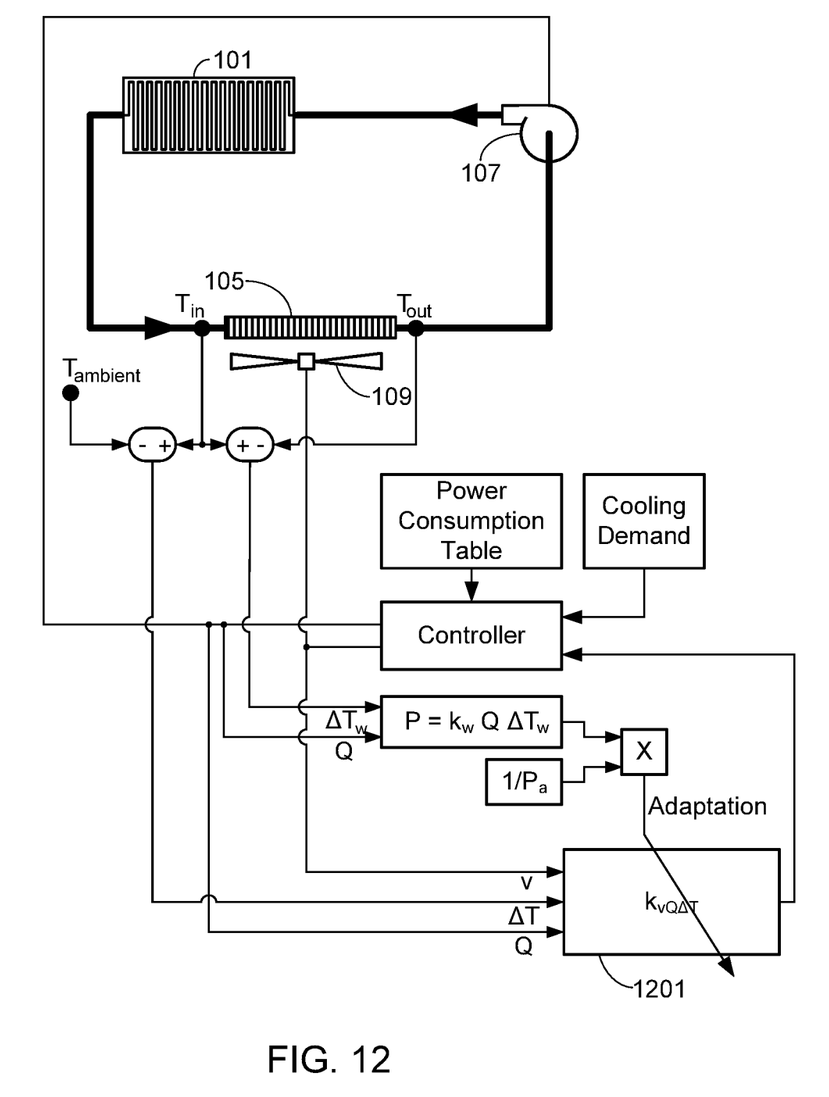
FIG. 12 illustrates a modification of the thermal management system shown in FIG. 1, configured to allow the power dissipation tables to be adjusted in real time.

In at least one preferred embodiment, the system is configured to calculate the actual cooling power in real time, thereby allowing the power dissipation tables (e.g., FIG. 8 and similar data for other values of $\Delta T$) to be adjusted in real time. FIG. 12 illustrates this embodiment based on the configuration shown in FIG. 1. It should be understood, however, that this same approach can be used equally well with other configurations of the thermal management system, for example those configurations shown in FIGS. 2 and 3. Additionally, while the example employs a battery pack as the heat source, the heat source may be comprised of any combination of a battery pack, motor, engine, power electronic, gearbox, and/or any other component/subsystem used in a vehicle that requires cooling.

As shown in FIG. 12, the power dissipation tables (i.e., $k_{v,Q\Delta T}$) 1201 is adjusted in accordance with the rule $$k_{v,Q\Delta T}(v,Q,\Delta T)=(1-\alpha)k_{v,Q\Delta T}(v,Q,\Delta T)+\alpha(k_w*Q*\Delta T_W),$$
where $\alpha$ is the adaptation factor. In a preferred embodiment, $\alpha$ is set at 0.05.

Figure 13:
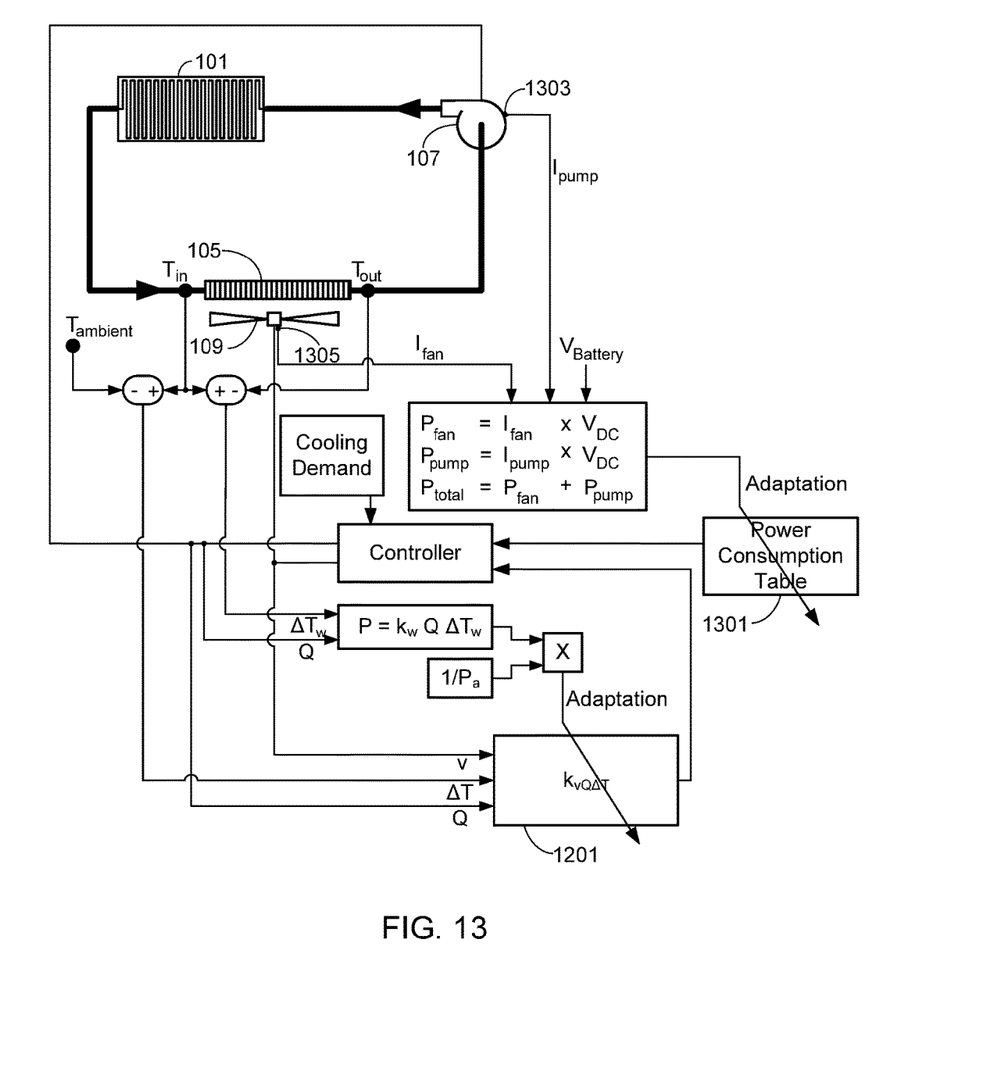
FIG. 13 illustrates a modification of the system shown in FIG. 12, configured to allow both the power dissipation tables and the power consumption table to be adjusted in real time.

FIG. 13 illustrates a modification of the embodiment shown in FIG. 12 which is configured to allow the power consumption tables (i.e., the data shown in FIG. 9) 1301 to be adjusted in real time. As shown, detectors 1303 and 1305 monitor the current draw of coolant pump 107 and blower fan 109, respectively.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of operating a vehicle thermal management system, said vehicle thermal management system comprising a heat exchanger and a heat source, the method comprising the steps of:
   characterizing the vehicle thermal management system, wherein the step of characterizing the vehicle thermal management system further comprises the step of determining a power dissipation data set for said vehicle thermal management system, wherein said power dissipation data set is comprised of a first plurality of power dissipation datum, a second plurality of power dissipation datum, and a third plurality of power dissipation datum, and wherein said step of determining said power dissipation data set further comprises the steps of:
      determining said first plurality of power dissipation datum relative to a plurality of air speeds through said heat exchanger;
      determining said second plurality of power dissipation datum relative to a plurality of coolant flow rates through said heat exchanger; and
      determining said third plurality of power dissipation datum relative to a plurality of input temperature differentials for said heat exchanger;
   determining a power dissipation factor data set based on said power dissipation data set;
   determining a power consumption data set corresponding to said vehicle thermal management system, wherein said power consumption data set represents a plurality of power consumption datum, and wherein each of said plurality of power consumption datum corresponds to at least one combination of a plurality of operating settings for said vehicle thermal management system;
   characterizing said heat source, wherein said heat source is thermally coupled to said vehicle thermal management system, wherein the step of characterizing said heat source further comprises the step of determining a heat source data set, and wherein said heat source data set is comprised of a plurality of heat generation datum versus a plurality of heat source usage datum;
   periodically determining a cooling demand based on said heat source usage datum;
   determining a power demand based on said cooling demand;
   deriving a subset of said plurality of operating settings from said power demand and said power dissipation factor data set and said power consumption data set, wherein said subset of said plurality of operating settings minimizes power consumption of said vehicle thermal management system while meeting said power demand; and
   applying said subset of said plurality of operating settings to said vehicle thermal management system.

2. The method of claim 1, further comprising the step of storing in a memory said power dissipation factor data set, said power consumption data set and said heat source data set, wherein said memory is accessible by a thermal management system controller, and wherein said thermal management system controller performs said steps of periodically determining said cooling demand, determining said power demand, and deriving and applying said subset of said plurality of operating settings.

3. The method of claim 1, wherein said step of determining said first plurality of power dissipation datum relative to said plurality of air speeds through said heat exchanger is performed while holding constant said coolant flow rate and said input temperature differential, and wherein said step of determining said second plurality of power dissipation datum relative to said plurality of coolant flow rates through said heat exchanger is performed while holding constant said air speed and said input temperature differential, and wherein said step of determining said third plurality of power dissipation datum relative to said plurality of input temperature differentials for said heat exchanger is performed while holding constant said air speed and said coolant flow rate and an ambient temperature.

4. The method of claim 1, wherein said power dissipation factor data set comprises said first plurality of power dissipation datum versus said second plurality of power dissipation datum versus said third plurality of power dissipation datum.

5. The method of claim 4, wherein said step of determining said power dissipation factor data set further comprises the step of dividing each of said first plurality of power dissipation datum and each of said second plurality of power dissipation datum and each of said third plurality of power dissipation datum by a preset power constant ($P_a$).

6. The method of claim 5, wherein said preset power constant is approximately centered within an operating domain of said vehicle thermal management system.

7. The method of claim 5, wherein said vehicle thermal management system further comprises a coolant pump, and wherein said preset power constant is approximately centered within an operating domain of said coolant pump.

8. The method of claim 5, wherein said vehicle thermal management system further comprises a blower fan, wherein said blower fan is configured to force air through said heat exchanger, and wherein said preset power constant is approximately centered within an operating domain of said blower fan.

9. The method of claim 1, wherein said vehicle thermal management system further comprises a blower fan and a coolant pump, and wherein each of said plurality of power consumption datum corresponds to power consumed for a combination of one of a plurality of blower fan speed settings and one of a plurality of coolant pump flow settings.

10. The method of claim 1, said heat source comprising a battery pack, said battery pack comprising a plurality of batteries, and wherein said step of characterizing said heat source further comprises the step of determining an efficiency versus operating temperature for said plurality of batteries.

11. The method of claim 10, wherein each of said plurality of heat source usage datum corresponds to a power level demand placed on said plurality of batteries.

12. The method of claim 1, wherein said step of determining said power demand further comprises the step of adding an offset to said cooling demand.

13. The method of claim 1, wherein said vehicle thermal management system further comprises a blower fan and a coolant pump, and wherein said subset of said plurality of operating settings further comprises a combination of one of a plurality of blower fan speed settings and one of a plurality of coolant pump flow settings.

14. The method of claim 1, further comprising the steps of:
monitoring an ambient temperature;
monitoring a current coolant input temperature corresponding to an input of said heat exchanger; and
determining a current input temperature differential between said ambient temperature and said current coolant input temperature, wherein said subset of said plurality of operating settings is derived from said power demand and said power dissipation factor data set and said power consumption data set and said current input temperature differential.

15. The method of claim 1, wherein said vehicle thermal management system further comprises a blower fan and a coolant pump, further comprising the steps of:
monitoring a blower fan current;
monitoring a coolant pump current; and
modifying said power consumption data set based on said blower fan current and said coolant pump current.

* * * * *